US010075460B2

(12) United States Patent
Malinowski et al.

(10) Patent No.: US 10,075,460 B2
(45) Date of Patent: Sep. 11, 2018

(54) POWER GRID UNIVERSAL DETECTION AND COUNTERMEASURE OVERLAY INTELLIGENCE ULTRA-LOW LATENCY HYPERVISOR (71) Applicant: REMTCS Inc., Red Bank, NJ (US)

(72) Inventors: Richard E. Malinowski, Colts Neck, NJ (US); Tommy Xaypanya, Lamar, MS (US)

(73) Assignee: REMTCS INC., Red Bank, NJ (US)

( * ) Notice: Subject to any disclaimer, the term of this patent is extended or adjusted under 35 U.S.C. 154(b) by 9 days.

(21) Appl. No.: 14/516,438

(22) Filed: Oct. 16, 2014

(65) Prior Publication Data

US 2015/0106934 A1    Apr. 16, 2015

Related U.S. Application Data (60) Provisional application No. 61/891,595, filed on Oct. 16, 2013.

(51) Int. Cl.
G06F 21/00 (2013.01)
H04L 29/06 (2006.01)
(Continued)

(52) U.S. Cl.
CPC ...... *H04L 63/1425* (2013.01); *H04L 63/1416* (2013.01); *H04L 63/1441* (2013.01); *Y04S 40/24* (2013.01)

(58) Field of Classification Search
CPC ............. H04L 63/1425; H04L 63/1441; H04L 63/1416; Y04S 40/24
See application file for complete search history.

(56) References Cited

U.S. PATENT DOCUMENTS 5,825,906 A    10/1998  Obata et al.
6,357,008 B1    3/2002  Nachenberg
(Continued)

FOREIGN PATENT DOCUMENTS

EP          2634988 A1 *  9/2013
WO    WO 2013/147903      10/2013

OTHER PUBLICATIONS

Yang Liu, Shiyan Hu, Tsung-Yi Ho; "Vulnerability assessment and defense technology for smart home cybersecurity considering pricing cyberattacks"; Nov. 2014; ICCAD '14: Proceedings of the 2014 IEEE/ACM International Conference on Computer-Aided Design; Publisher: IEEE Press; pp. 183-190.*

(Continued)

*Primary Examiner* — Kendall Dolly
*Assistant Examiner* — Courtney Fields
(74) *Attorney, Agent, or Firm* — Sheridan Ross P.C.

(57) ABSTRACT

Any system with an interface may be attacked by a bad actor. If that interface is exposed to a network, the bad actor may launch a remote attack or cause other systems to attack the system. Many attacks exploit vulnerabilities that are unknown to the system operators (e.g., zero-day attacks). Power grid components, such as electricity meters, are increasingly networked and, therefore, increasingly attacked. By determining a pattern of behavior for a meter and then looking for a variation of the pattern, an attack may be identified. Once an attack is discovered, countermeasures may be launched to restore the system to normal operations, harden the system against future attack, and/or retaliate against the attacker.

14 Claims, 3 Drawing Sheets (51) Int. Cl.
  *G06F 9/48* (2006.01)
  *H02J 13/00* (2006.01)

(56) References Cited

U.S. PATENT DOCUMENTS

| | | | |
|---|---|---|---|
| 7,321,883 | B1 | 1/2008 | Freedy et al. |
| 7,891,004 | B1 | 2/2011 | Gelvin et al. |
| 8,812,868 | B2 | 8/2014 | Blaisdell et al. |
| 8,918,881 | B2 | 12/2014 | Bettini |
| 9,068,858 | B2 * | 6/2015 | Kelley ............... G01D 4/004 |
| 2002/0162015 | A1 | 10/2002 | Tang |
| 2005/0050336 | A1 | 3/2005 | Liang et al. |
| 2005/0198242 | A1 | 9/2005 | Kim |
| 2005/0267911 | A1 | 12/2005 | Kamath et al. |
| 2005/0268338 | A1 | 12/2005 | Van Der Made |
| 2006/0026675 | A1 | 2/2006 | Cai et al. |
| 2006/0034305 | A1 * | 2/2006 | Heimerdinger ......... H04L 67/12 370/408 |
| 2008/0016570 | A1 | 1/2008 | Capalik |
| 2008/0040801 | A1 | 2/2008 | Buriano et al. |
| 2009/0089879 | A1 | 4/2009 | Wang et al. |
| 2009/0165137 | A1 | 6/2009 | Yoo et al. |
| 2009/0172816 | A1 | 7/2009 | Maino et al. |
| 2009/0300589 | A1 | 12/2009 | Watters et al. |
| 2010/0138925 | A1 | 6/2010 | Barai et al. |
| 2010/0153315 | A1 | 6/2010 | Gao et al. |
| 2011/0235650 | A1 | 9/2011 | Martinez et al. |
| 2011/0258701 | A1 | 10/2011 | Cruz et al. |
| 2012/0215728 | A1 | 8/2012 | Isaiadis et al. |
| 2012/0240185 | A1 | 9/2012 | Kapoor et al. |
| 2012/0284699 | A1 | 11/2012 | Van Der Merwe et al. |
| 2012/0284790 | A1 * | 11/2012 | Bhargava ............ G06F 11/3612 726/22 |
| 2013/0014261 | A1 | 1/2013 | Milliken et al. |
| 2013/0055246 | A1 | 2/2013 | Li et al. |
| 2013/0097704 | A1 | 4/2013 | Gavrilut et al. |
| 2013/0097706 | A1 | 4/2013 | Titonis et al. |
| 2013/0117006 | A1 | 5/2013 | Varghese et al. |
| 2013/0145065 | A1 | 6/2013 | Ricci |
| 2013/0145482 | A1 | 6/2013 | Ricci et al. |
| 2013/0232576 | A1 | 9/2013 | Karnikis et al. |
| 2013/0332026 | A1 | 12/2013 | McKown et al. |
| 2014/0208397 | A1 | 7/2014 | Peterson et al. |
| 2014/0215621 | A1 | 7/2014 | Xaypanya et al. |
| 2014/0279762 | A1 | 9/2014 | Xaypanya et al. |
| 2014/0279770 | A1 | 9/2014 | Xaypanya et al. |
| 2014/0283079 | A1 | 9/2014 | Xaypanya et al. |

OTHER PUBLICATIONS

International Preliminary Report on Patentability for International (PCT) Patent Application No. PCT/US2014/012841, dated Aug. 6, 2015 7 pages.
International Preliminary Report on Patentability for International (PCT) Patent Application No. PCT/US2014/030362, dated Sep. 24, 2015 7 pages.
International Preliminary Report on Patentability for International (PCT) Patent Application No. PCT/US2014/021098, dated Sep. 24, 2015 6 pages.
Official Action for U.S. Appl. No. 14/216,345, dated Nov. 6, 2015 12 pages.
U.S. Appl. No. 14/216,345, filed Oct. 16, 2014, Xaypanya et al.
U.S. Appl. No. 14/516,418, filed Oct. 16, 2014, Xaypanya et al.
U.S. Appl. No. 14/516,453, filed Oct. 16, 2014, Xaypanya et al.
U.S. Appl. No. 14/528,560, filed Oct. 30, 2014, Xaypanya et al.
International Search Report and Written Opinion for International (PCT) Patent Application No. PCT/US14/12841, dated Jun. 16, 2014 8 pages.
International Search Report and Written Opinion for International (PCT) Patent Application No. PCT/US14/30362, dated Aug. 22, 2014 8 pages.
International Search Report and Written Opinion for International (PCT) Patent Application No. PCT/US14/21098, dated Aug. 5, 2014 7 pages.
Alazab et al. "Zero-day Malware Detection based on Supervised Learning Algorithms of API call Signatures," Proceedings of the 9th Australasian Data Mining Conference, Australian Computer Society, 2011, Ballarat, Australia, pp. 171-182.
International Search Report for International (PCT) Patent Application No. PCT/US2014/060926, dated Jan. 29, 2015 11 pages.
Official Action for U.S. Appl. No. 14/163,186, dated Apr. 20, 2015 16 pages.

* cited by examiner

POWER GRID UNIVERSAL DETECTION AND COUNTERMEASURE OVERLAY INTELLIGENCE ULTRA-LOW LATENCY HYPERVISOR

CROSS-REFERENCE TO RELATED APPLICATIONS

The present application is a Continuation in Part of U.S. patent application Ser. No. 14/216,634, filed Mar. 17, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/216,345, filed Mar. 17, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/216,665, filed Mar. 17, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/199,917, filed Mar. 6, 2014, which claims the benefit of U.S. Provisional Application No. 61/901,269, filed Nov. 7, 2013, and claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and the present application is a Continuation-in-Part of U.S. patent application Ser. No. 14/163,186, filed Jan. 24, 2014, issued on May 3, 2016 as U.S. Pat. No. 9,332,028, which claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/794,547, filed Mar. 15, 2013, and claims the benefit of U.S. Provisional Application No. 61/794,505, filed Mar. 15, 2013, and claims the benefit of U.S. Provisional Application No. 61/794,472, filed Mar. 15, 2013, and claims the benefit of U.S. Provisional Application No. 61/794,430, filed Mar. 15, 2013, and claims the benefit of U.S. Provisional Application No. 61/756,573, filed Jan. 25, 2013, and the present application claims the benefit of U.S. Provisional Application No. 61/897,745, filed Oct. 30, 2013, and claims the benefit of U.S. Provisional Application No. 61/891,598, filed Oct. 16, 2013, and claims the benefit of U.S. Provisional Application No. 61/891,595, filed Oct. 16, 2013, and claims the benefit of U.S. Provisional Application No. 61/891,587, filed Oct. 16, 2013, the complete disclosures of which are incorporated herein by reference in their entirety.

FIELD OF THE DISCLOSURE

The present disclosure is generally directed toward power grid networks and the security thereof.

BACKGROUND

Enterprises and organizations cannot fight today's digital terrorists or cyber criminals with yesterday's defensively-focused security best practices. The primary problem with defensively-focused security solutions is that they do not provide a deterrent or countermeasure to stop repetitive or future attacks. The simple fact remains that a defender has to get it right every time but an attacker has to get it right just once.

In the United States and other countries, power outages affecting a substantial geographic area have occurred, often the problem is traced back to a single component, such as a relay, lightening strike, or a bird-induced short circuit. The outage is caused when one overloaded segment shuts down to protect itself from damage. The resulting shutdown adds to the burden on other segments which, in turn, become overloaded and shut down. While these are known vulnerabilities that power grid operators are striving to address, the hardening of the power grid requires a significant investment in time and other resources. However, such defenses are built with past events in mind and address the failure of a single component. Defenses against an actual attack, that may attack multiple components, multiple times, are a continuing concern.

The truth is that nowadays security best practices and digital strategies have the shelf-life of a little over two weeks. Security professionals cannot detect or produce antidotes fast enough to keep up with the rate at which cyber criminals are evolving.

Utilizing non-connected devices, devices networked only to other trusted devices, or devices with no connection to public networks (e.g., the Internet) may help reduce the opportunity for malicious software (malware) but it also denies the efficiency and features that may be gained from legitimate information gathering and control access. Non-connected devices may still be compromised if a bad actor has physical access to the device, which is often the case with electricity meters.

Even non-connected devices are subject to risk as a user may install compromised computer media within a private network or even an individual device. "Social engineering" exploits human actions and/or inactions to infect a network. For example, a user may attach media to a computer and, knowingly or unknowingly, infect a network. As one notable example, Stuxnet was launch for the purpose of infiltrating an isolated computer network to cause uranium enrichment centrifuges to operate in a manner that was predicted to cause physical damage to the centrifuges. Before executing the code, Stuxnet would spread from device to device. Devices that were not targeted, were either unaffected or, if possible, used to continue the search for the target devices. Once Stuxnet found its target, namely programmable logic controllers (PLCs) controlling the centrifuges, it would prepare for the attack. Stuxnet would first enter a listen mode to learn the normal operating parameters of the centrifuges. Then, upon being triggered, the attack would be launched and cause the PLCs to operate the centrifuges in a manner calculated to damage the centrifuges while reporting the learned, normal operating parameters, even while the centrifuges were operating well outside of their normal parameters.

Stuxnet was most likely brought into the isolated network via social engineering, for example, a USB drive or CD-ROM that appeared to be dropped in a parking lot or other conspicuous location. An unsuspecting individual inserts the media to a computer and, while all appears normal to the user, Stuxnet entered the network. Stuxnet has since escaped its original target and is now out in the public domain, which includes bad actors. These bad actors may leverage Stuxnet as a base platform to launch their own attack. Stuxnet-based malware is only one example. Other attacks may be based on prior attacks or entirely new or enter via a previously unknown vulnerability (e.g., zero-day attack).

So the question remains, how do grid operators and security professionals combat against an enemy that's continuously innovating their digital attacks? To proactively address this security challenge, organizations must adopt and practice an offensively-focused digital security policy.

SUMMARY

It is with respect to the above issues and other problems that the embodiments presented herein were contemplated.

Using Advance Metering Infrastructure (AMI) network, a cross-platform interpreter is layered to collect various data and protocols, which is then translated using a statistical artificial intelligent (A.I.) driven database/correlation engine. The engine automates profiling of each meter's power usages (from individual meters), security risks/updates, power saving potentials, etc. The profile data packets are then pushed into a reasoning/logical interpreter that detects anomalies, such as the Analytical Neural Network Interface (ANNI), as described with respect to U.S. Patent Publication 2014/0215621 and entitled "System, method, and apparatus for providing network security," and is incorporated herein by reference in its entirety.

Once the ANNI approves the security of the data and its behavior, the data is compressed into an ultra-low latency packet and burst-transmitted back into the utility network.

The present disclosure relates to computer software using artificial intelligences. More specifically, the present disclosure relates to artificial intelligence software security system based on protecting Advance Metering Infrastructures.

Power Grid Universal Detection & Countermeasure Overlay Intelligence Ultra Latency Hypervisor is an artificial intelligence driven technology utilizing state of the art technology, developed by REMTCS, to intercept various ANSI security protocols and profile collected meter data using a cross-platform interrupter correlation engine.

The technology concept is based off technology which uses multiple artificial intelligences technology to cluster a statistical approach of historical and local/relevant data A.I. engine onto a logical, reasoning A.I. that profiles and reacts using pre-learning & evolving variables.

The present disclosure is directed toward a Power Grid Universal Detection & Countermeasure Overlay Intelligence Ultra Latency Hypervisor that uses triggering and constant behavioral monitoring to detect and control meter data, as well have the ability to inject code to control the advance meters.

The system and method disclosed herein provides the ability to proactively go on the counteroffensive to potential power or grid interruptions by creating a delay once a malicious activity has been detected to perform automated forensics then disinfect the attack using its security arsenal, which has decision & command scripts working as an engine.

In one embodiment, a power grid information system infrastructure is disclosed, comprising: a network interface operable to receive data regarding operation of an electricity meter; a processing unit operable to derive a usage profile from the received data; an analysis engine operable to detect an anomaly in the usage profile; and a response engine operable to respond or suggest a response to the anomaly.

In another embodiment, a computer is disclosed, comprising: a network interface operable to receive data regarding operation of an electricity meter; a processing unit operable to derive a usage profile from the received data; an analysis engine operable to detect an anomaly in the usage profile; and a response engine operable to respond or suggest a response to the anomaly.

In still another embodiment, a non-transitory computer readable medium is disclosed with instructions thereon that when read by a computer cause the computer to perform: accessing data regarding an electricity meter; derive a usage profile from the accessed data; detect an anomaly in the usage profile; and respond to the anomaly.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedence.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
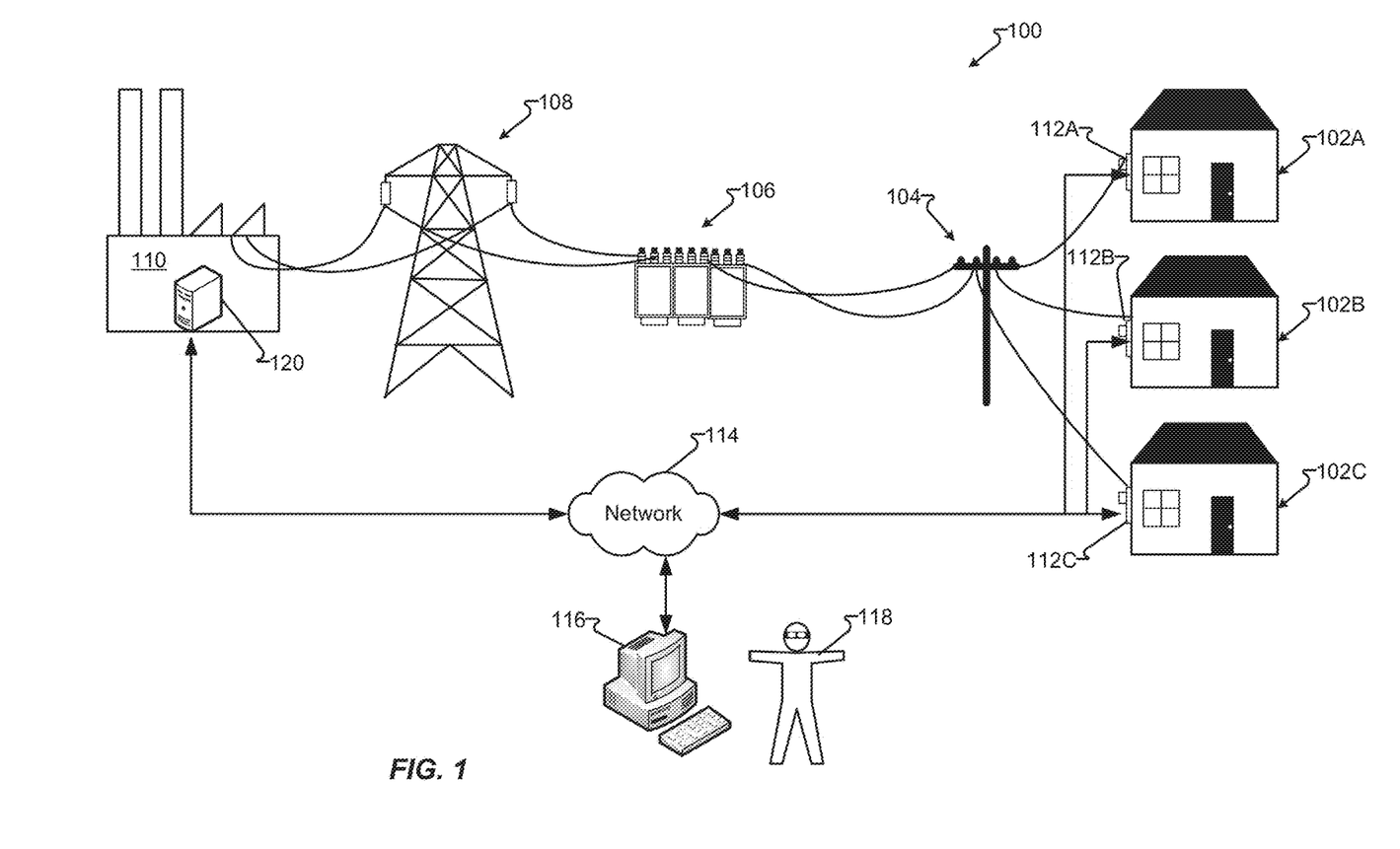
FIG. 1 depicts a power grid in accordance with embodiments of the present disclosure.

FIG. 1 shows illustrative power grid 100 in accordance with embodiments of the present disclosure. In one embodiment, power station 110 generates electricity. Power station 100 utilizes a distribution network comprising transmission lines 108, substations 106, distribution lines 104, to endpoints 102. It should be appreciated by those of ordinary skill in the art that other variations of power grid 100 are contemplated without departing from the disclosure provided herein.

Power station 110 forms a portion of an Advanced Metering Infrastructure (AMI) network comprising meters 112. Meters 112 perform the measuring of electricity usage for a particular user or property, such as houses 102. Meters 112 often incorporate additional functionality such as real time usage reporting, power outages, etc. Meters 112 may also be configured to be operable, for example, to permit at least partial control over a high-use appliance, such as to temporarily stop operation of an air conditioner. As power grid operators commonly build infrastructure to support peak demand, however, many operators strive to level out those peaks, such as by allowing time-specific billing. Users, such as homes 102, or commercial or industrial users, who can transfer at least some of their electricity consumption from high-demand times to low-demand times allow for reduced infrastructure investment and generating demands. As a benefit, pricing at off-hours provides an incentive to consume electricity at times other than those having peak pricing.

The forgoing features requires meters 112 to have computer processing functionality and be connectable to other devices or be networked in order to report data and/or respond to commands. Such connectivity may be continuous, periodic, or ad hoc. For example, meters 112 may execute programs without connectivity and upon the occurrence of an event and/or time-based trigger connect to a network to send and/or receive data. This connectivity creates a potential entry point for an attack vector, which may be directed at one or more meters 112, substation 106, power station 110, transmission lines 108, distribution lines 104, and/or other portions of power grid 100. While an attack may be directed at the power infrastructure (e.g., the generation and distribution of electricity), the attack may be generated at the information systems infrastructure (e.g., billing, command and control, data processing, communication, etc.) that enables the power infrastructure to work or at least work as intended.

In one embodiment, information system infrastructure comprises network 114. Network 114 serves as a communication conduit between computer 120 and meters 112. Network 114 may be, or comprise, a private network, public network (e.g., Internet), wireless network (e.g., cellular, microwave link, radio frequency link, etc.), or other communications network. Network 114 may be distinct from power grid 100 or partially or entirely integrated (e.g., data over power).

In one embodiment, computer 120 is co-located with power station 110. In other embodiments, computer 120 may comprise a single machine, multiple machines, or a vast array of dedicated servers (e.g., a server farm, private cloud) and/or shared servers (e.g., the cloud). In another embodiment, sever 120 may be geographically distinct from power station 110 or distributed across a plurality of locations, which may further include power station 110.

It is an unfortunate reality that, for a variety of reasons, malicious agent 118 is intent on do harm to power grid 100, gather information (e.g., steal customer billing information), and/or perform other malicious acts. Malicious agent 118 may utilize computer 116 as one point of entry into network 114. Malicious agent 118 may utilize other components of power grid 100 and/or network 114 to launch an attack. If a specific attack or type of attack were to be known, the vulnerable components could be hardened to prevent or at least mitigate the impact of the attack, as is known in the prior art of non-zero-day attacks. However, one benefit of the disclosure provided herein allows for attacks on known exploits as well as zero-day attacks to be identified, contained, mitigated, and/or counter-attacked.

The specific attack may be launched from a physically controlled computer, such as computer 116 and/or a controlled computer (e.g., "zombie"). The controlled computer may be one or more computers using network 114, such as in a distributed denial of service attack, or a compromised device located within a trusted portion of the information systems infrastructure.

In one embodiment, computer 120 analyzes data received regarding meters 112. A sufficiently large pool of received data allows for the identification of anomalies. An anomaly may include received data that is outside of the customary or known envelope of operating parameters, the received data may or may not indicate one or more meters 112 are operating within their designed parameters.

While not every anomaly will be the result of malware or other attack. In another embodiment, the response to non-malware anomalies may be, at least partially, the same (e.g., analyze the anomaly, prevent damage, protect data, apply remedies, etc.). In another embodiment, non-malware anomalies may be processed as malware-based anomalies. For example, a component of power grid 100 may fail and produce an anomaly in the form of a power outage. The outage may be analyzed, other components are activated/deactivated to prevent the outage from spreading, and a remedy applied, such as by notifying the operators of substation 106 that a component has failed and required replacement. In another embodiment, an anomaly is expected wherein the received data indicating the anomaly is ignored. For example, a component of power grid 100 is taken off-line for planned repairs and then causes an anomaly in the form of a usage spike on other components.

Figure 2:
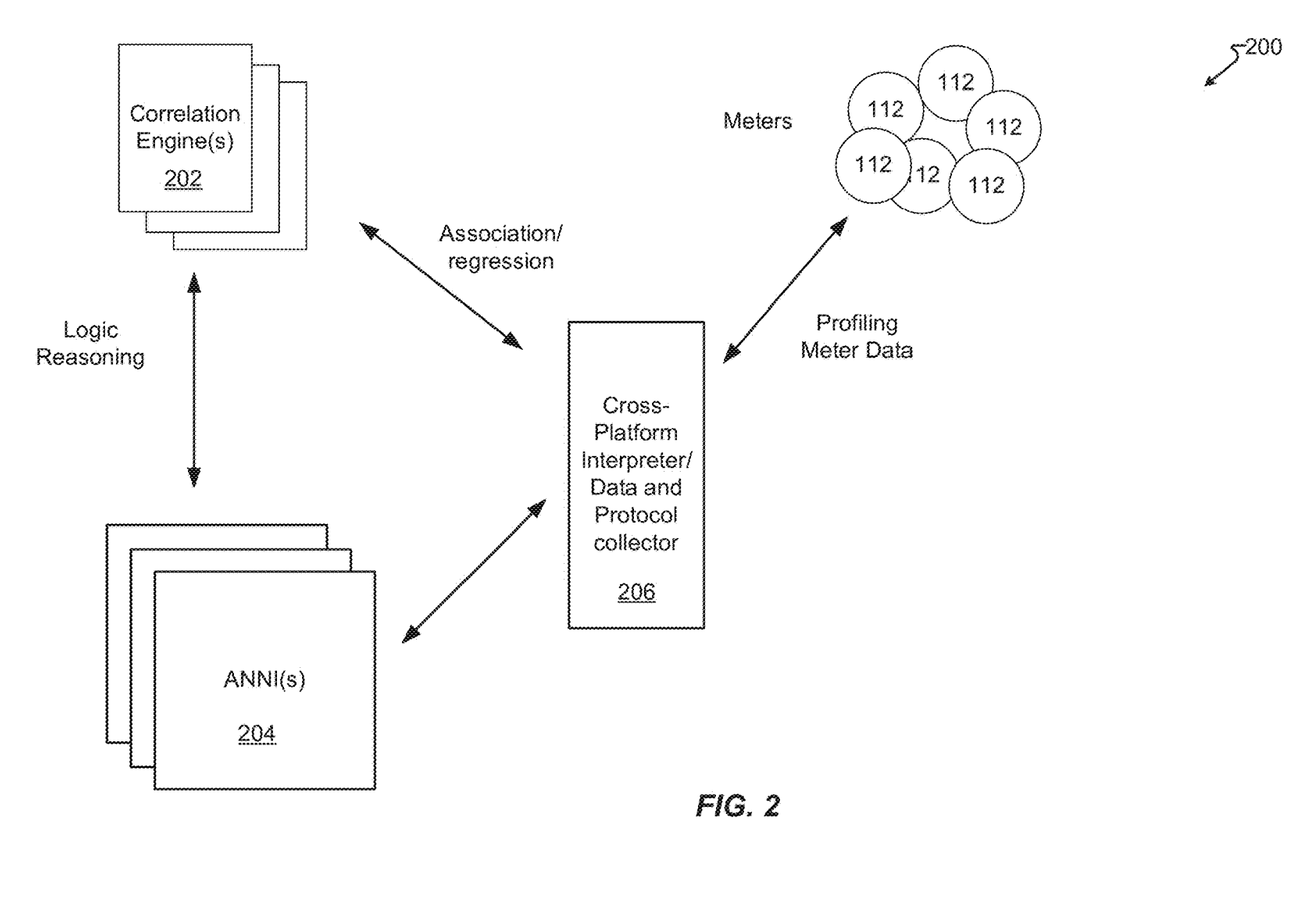
FIG. 2 depicts a diagram of power grid components in accordance with embodiments of the present disclosure.

FIG. 2 shows illustrative diagram 200 of power grid components in accordance with embodiments of the present disclosure. In one embodiment, meters 112 send data (e.g., usage information, status, etc.) and receive command and control signals (e.g., throttle usage, load software patch, ad hoc reports, etc.). In another embodiment, cross platform interpreter/data and protocol collector ("collector") 206 may serve as a collection point and/or distribution point for meters 112 such as to gather data, protocols, such as ANSI security protocols, and/or distribute command and control signals. Correlation engines 202 profiles each of meters 112 and may further profile security risks, power saving opportunities, or other operational aspects for one or more of meters 112.

In another embodiment, ANNI 204 provides the analysis to determine of an anomaly is malware and, if so, the response. ANNI 204 may access security protocols or other information from correlation engine 202, collector 206, and/or one or more meters 112. For example, malware may be detected resulting on meters 112 showing a fabricated amount of electricity usage (e.g., zero, artificially low, artificially high, etc.). ANNI 204 may, for example, select a software patch and burst transmit the patch back to meters 112. If such a fix is not a option, or for other reasons determined not to be an option, ANNI 204 may cause meters 112 to record electricity usage locally for later transmission. As a result, the live stream of data from meters 112, which is reporting fabricated usage amounts, may be discarded for billing purposes and once meters 112 report actual usage, the actual usage then utilized for billing.

Figure 3A:
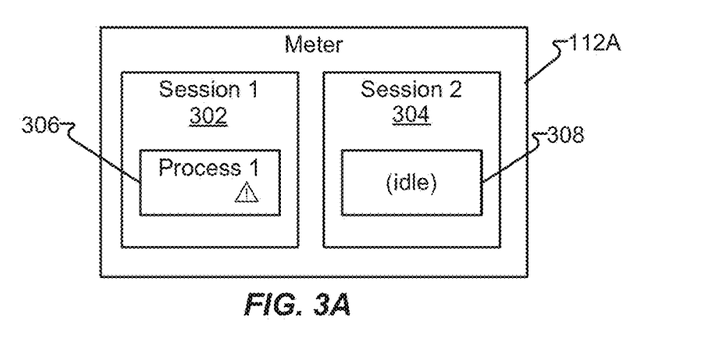
FIGS. 3A-3C depict malware removal of a meter in accordance with embodiments of the present disclosure
Figure 3B:
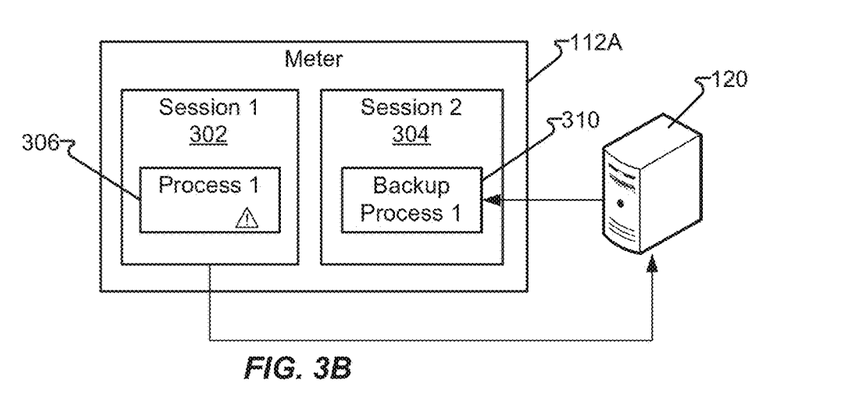
Figure 3C:
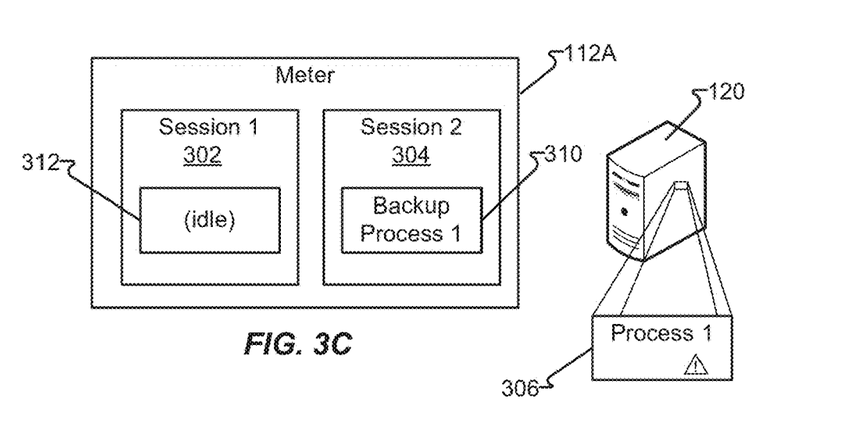

FIGS. 3A-3C show malware removal of meter 112A in accordance with embodiments of the present disclosure. Meter 112A has been determined to be under attack. ANNI 204 may, amongst other actions, seek to isolate the attack so that further study or other actions may be taken. In one embodiment, meter 112A has capable of having session 1 (302) and session 2 (304). As is known in the computing arts, a session may comprise a virtual machine, session-specific communications, and/or other aspects of input, output, and data processing that may appear to be executing or utilizing physical components directly but are not. Instead the programs and/or communications are managed within at least one session layer, which in turn utilizes physical components.

Session 1 (302) is operating process 306 and session 2 (304) is executing an idle process 308. Idle processes 308, 312 are processes that may be preempted by another process and may include null processes, heartbeat processes, house-keeping processes, or no process at all. Process 1 (306) has been determined, such as by ANNI 204, to have an anomaly which is associated with malware. ANNI 204 may further determine that certain advantages may be gained by allowing process 1 (306) to continue operating. As process 1 (306) includes malware, isolating process 1 (306) into a controlled environment is initiated.

FIG. 3B shows a subsequent configuration of meter 112A. In one embodiment, server 120 has accessed a backup process 1 and caused it to be loaded to session 2 (304) of meter 122A. In another embodiment, server 120 has copied session 1 (302), including process 1 (306). Copying the session comprises the instructions, register values, stored information, communication session identifiers, and/or other aspects of process 1 (306) running within session 1 (302).

FIG. 3C shows a subsequent configuration of meter 112A. In one embodiment, server 120 includes a controlled operating environment such that process 1 (306) may be allowed to execute with inputs and outputs controlled and virtualized such that process 1 (306), including malware, may continue to execute with the appearance of being unchecked. For example, Process 1 (306) may include instructions to communicate with another meter, for example meter 112B for the purposes of shutting it down. Server 120 receives the message, selects a response, and provide process 1 (306) with the selected response. Malware, such as a denial of service or distributed denial of service may be incorporate calls to other machines controlled by an attacker and further provide an opportunity to learn who else may be infected, the source of the attack, and/or a potential target of a countermeasure.

In another embodiment, meter 112A has been loaded with backup process 1 (310) and session 1 (302) is now idle 312. As a benefit meter 112A may resume normal operation independently of the activities on server 120 to study process 1 (306).

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A power grid information system infrastructure, comprising:
  a memory for storing instructions and a processor coupled to the memory and configured to execute the instructions, by the processor, when the executed instructions call:
    a network interface operable to receive data, the received data comprising profile data packets received from and regarding operation of an electricity meter;
    a processing unit operable to derive a usage profile from the received data;
    an analysis engine operable to detect an anomaly in the usage profile, wherein the analysis is performed by the analysis engine during system interrupts enabling the analysis engine to execute additional computations even though the processing unit is not executing any code; and
    a response engine operable to respond or suggest a response to the anomaly; and
    wherein the response engine performs the selection of a security update and causes the network interface to transmit the security update to the electricity meter for execution by the electricity meter, in response to the analysis engine detecting the anomaly and wherein the anomaly is determined by the analysis engine to be mitigated by the operation of the electricity meter executing a set of instructions comprising the security update;
    wherein the response engine is further configured to, in response to the anomaly being associated with an existing operational session of at least one component of the power grid information system infrastructure, launch a new operational session and transition the existing operational session to a virtual environment; and
    wherein the response engine maintains the operation of the anomaly in the virtual environment and performs forensic analysis on the anomaly.

2. The power grid information system infrastructure of claim 1, further comprising:
  the network interface is operable to receive a security protocol; and
  wherein the response engine is further operable to respond to the anomaly in accord with the security protocol.

3. The power grid information system infrastructure of claim 1, further comprising:
  the network interface receives a security risk signature; and
  wherein the analysis engine is further operable to detect the anomaly as associated with the security risk signature.

4. The power grid information system infrastructure of claim 1, further comprising:
  the network interface receives security response updates; and
  wherein the response engine is further operable to respond to the anomaly with the response update.

5. The power grid information system infrastructure of claim 1, further comprising:
  the network interface receives a power saving indicator; and
  wherein the response engine is further operable to signal a power generation controller of a power saving opportunity associated with the power saving indicator.

6. The power grid information system infrastructure of claim 1, wherein the response engine is operable to select a security update and cause the network interface to transmit the security update to the electricity meter for execution by the electricity meter.

7. The power grid information system infrastructure of claim 1, wherein the analysis engine is further operable to determine a source of the anomaly, select a counterattack, and cause the response engine to launch the counterattack at the source.

8. The power grid information system infrastructure of claim 1, wherein the analysis engine is further operable to determine a physical improvement to the power grid information system infrastructure and cause a message comprising the physical improvement to be sent to a resource responsible for implementing the physical improvement.

9. A computer, comprising:
a memory for storing instructions and a processor coupled to the memory and configured to execute the instructions, by the processor, when the executed instructions call:
a network interface operable to receive data, the received data comprising profile data packets received from and regarding operation of an electricity meter;
a processing unit operable to derive a usage profile from the received data;
an analysis engine operable to detect an anomaly in the usage profile, wherein the analysis is performed by the analysis engine during system interrupts enabling the analysis engine to execute additional computations even though the processing unit is not executing any code; and
a response engine operable to respond or suggest a response to the anomaly; and
wherein the response engine performs the selection of a security update and causes the network interface to transmit the security update to the electricity meter for execution by the electricity meter, in response to the analysis engine detecting the anomaly and wherein the anomaly is determined by the analysis engine to be mitigated by the operation of the electricity meter executing a set of instructions comprising the security update;
wherein the response engine is further configured to, in response to the anomaly being associated with an existing operational session of at least one component of the power grid information system infrastructure, launch a new operational session and transition the existing operational session to a virtual environment; and
wherein the response engine maintains the operation of the anomaly in the virtual environment and performs forensic analysis on the anomaly.

10. The computer of claim 9, wherein:
the network interface is further operable to receive a power saving indicator; and
wherein the response engine is further operable to signal a power generation controller of a power saving opportunity associated with the power saving indicator.

11. The computer of claim 9, wherein:
the computer, via the network interface, is further operable to receive a security protocol; and
wherein the response engine is further operable to respond to the anomaly in accord with the security protocol.

12. The computer of claim 9, wherein:
the computer, via the network interface, is operable to receive a security risk signature; and
the analysis engine is further operable to detect the anomaly as associated with the security risk signature.

13. A non-transitory computer readable medium with instructions thereon that when read by a computer cause the computer to perform:
accessing data comprising profile data packets received from and regarding an electricity meter;
derive a usage profile from the accessed data;
detect an anomaly in the usage profile, wherein the detection is performed by an analysis engine during system interrupts enabling the analysis engine to execute additional computations even though a processing unit executing the analysis engine is not executing any code; and
respond to the anomaly;
select a security update and transmit a security update to the electricity meter for execution by the electricity meter;
determine whether the anomaly is associated with an existing operational session of at least one component of the power grid information system infrastructure;
upon determining that the anomaly is associated with the existing operational session of the at least one component of the power grid information system infrastructure, launch a new operational session and transition the existing operational session to a virtual environment; and
maintain the operation of the anomaly in the virtual environment and perform forensic analysis of the anomaly operating therein.

14. The non-transitory computer readable medium of claim 13, further comprising instructions to:
determine a source of the anomaly;
select a counterattack; and
launch the counterattack on the source.

* * * * *